Patented Feb. 23, 1932

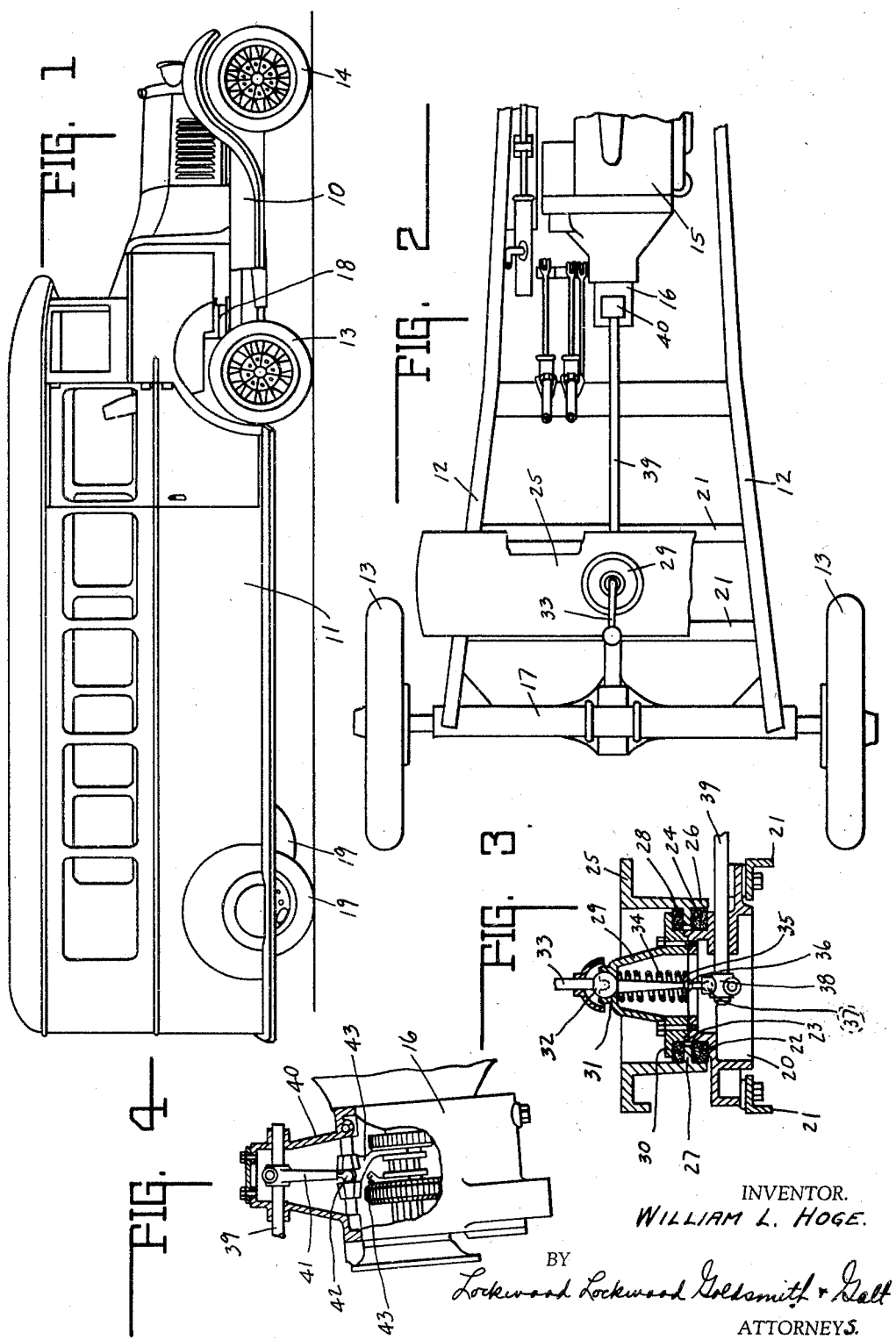

1,846,394

UNITED STATES PATENT OFFICE

WILLIAM L. HOGE, OF LOUISVILLE, KENTUCKY, ASSIGNOR TO MENGEL BODY COMPANY, OF LOUISVILLE, KENTUCKY, A CORPORATION

GEAR SHIFT APPARATUS FOR TRACTOR-TRAILER VEHICLES

Original application filed July 23, 1931, Serial No. 552,701. Divided and this application filed July 27, 1931. Serial No. 553,361.

This invention relates to a gear shift apparatus for a tractor-trailer vehicle of the type disclosed in the co-pending application Serial No. 552,701, filed July 23, 1931, of which this is a division. In this type of vehicle, a tractor unit is provided in the form of a typical automobile chassis and the front end of a trailer unit is pivotally mounted thereon. The operator is seated within the trailer unit and controls the propelling mechanism, steering mechanism and brake mechanism of the tractor unit by remote control. For a selective transmission having several speeds forward and a reverse speed, the problem of providing a simple and reliable remote control is more difficult than in the simpler control elements, such as those used for steering, for clutch control and for the brakes.

The principal object of the present invention is to solve the problem of remote control for the gear shift mechanism of such a tractor-trailer vehicle in the simplest and most economical manner possible.

The principal feature of the invention resides in the fact that the pivot point for the movement of the operator's lever used for shifting gears is located upon the axis of the pivot bearing by means of which the tractor and trailer units are connected. In this position, the said lever is within the reach of the operator irrespective of the pivotal movement of the tractor and trailer and all of the parts of the gear shifting apparatus may be carried upon the tractor chassis. No flexible connections, such as hydraulic conduits or electrical cables, are, therefore, required since the said lever may be mounted upon a part fixedly carried by the tractor chassis and the supports for all of the connecting parts may be similarly mounted.

Other features of the invention reside in the particular arrangement of parts, by means of which the before-mentioned object is obtained.

Other objects and features of the invention will be understood from the accompanying drawings and the following description and claims:

Figure 1 is an elevational view illustrating the type of vehicle to which the invention is applied. Figure 2 is a plan view of a portion of the tractor chassis and a part of the trailer chassis carried thereby. Figure 3 is a sectional view taken substantially upon the center line of the pivot bearing connecting the tractor and the trailer units. Figure 4 is an elevational view of the transmission casing of the tractor with parts cut away to show other parts in detail.

In the drawings, a tractor unit is indicated by the numeral 10 and a trailer unit by the numeral 11. The tractor unit is supplied with the usual chassis frame members 12, rear drive wheels 13, front wheels 14, engine 15, transmission housing 16 and rear spring construction 17. The trailer unit 11 is mounted upon the tractor unit 10 by means of a pivot bearing 18 and the rear end of the said trailer unit is carried by ground wheels 19.

The preferred construction of the pivot bearing 18 is illustrated in Figure 3 wherein a support casting 20 is carried upon a pair of frame members 21 which are in turn fastened to the chassis frame members 12. The support member 20 is formed with an annular bearing surface 22 and an up-turned annular lip 23. An annular pad 24 of rubber or other resilient material rests upon the surface 22 and its inner edge engages the lip 23. A support casting 25 extending transversely of the machine is formed with a downwardly-extending lip 26 engaging the outer edge of the pad 24 and with an internal flange 27 resting upon the said pad. A second similar pad 28 rests upon the flange 27 and a cap casting 29 is bolted to the support member 20 and is formed with an outwardly-extending flange 30 resting upon the pad 28. By this means, the support member 25 is pivotally and yieldingly mounted upon the support member 20. The forward end of the trailer frame is carried directly upon the support casting 25 and is bolted thereto.

The cap casting 29 is formed with an upwardly-extending portion having a cup 31 in which rests a ball 32 formed upon a gear shift lever 33. The said ball is yieldingly held within the said cup by means of a compression spring 34 abutting against a spring seat 35 in turn resting upon an enlarged portion 36 of the lower end of the lever 33. The extreme lower end of the lever 33 terminates in a ball 37 resting in a cup formed upon a rocker 38. The rocker 38 is clamped upon the end of a horizontal rod 39 and the said rod is rotatably and slidably mounted upon the support member 20. The forward end of said rod is rotatably and slidably mounted upon the cover casting 40 of the transmission casing 16. Within the cover casting 40 an arm 41 is clamped upon the rod 39 and the lower end of said arm terminates in a ball 42 engaging the shifting forks 43 of the usual type of selective gear shift mechanism.

By means of this construction, the usual H-movement of the gear shift lever 33 is translated into a rotating and sliding movement of the rod 39 which in turn results in a similar H-movement of the arm 41 in the reverse direction. The arm 41 operates the shifting forks 43 of the gear shift mechanism in the usual manner. It will also be seen that the pivot point of the gear shift lever 33 does not move with respect to the operator even though the operator's seat is supported upon the trailer frame. The lever 33 is, therefore, always within reach of the operator irrespective of the pivotal movement of the tractor and trailer.

While the above description relates particularly to an H-movement of the gear shift lever resulting in four positions adapted to three speeds forward and one reverse, it is evident that the apparatus is equally applicable to a similar gear shift mechanism for additional speeds. When more than three speeds forward are desired, additional positions of the gear shift lever are used and the conventional form of latch mechanism is provided upon the lever. Other details of the construction herein disclosed may be varied without departing from the scope of the invention as defined by the appended claims.

The invention claimed is:

1. In a vehicle having a tractor chassis carrying propelling mechanism including a selective transmission and having a trailer chassis, one end of which is pivotally mounted upon the tractor chassis, said pivotal mounting providing somewhat about a substantial vertical axis, the combination of a universally-mounted lever having its center of movement substantially upon the axis of said pivotal mounting, and connections between said lever and the selective transmission for operating said transmission.

2. In a vehicle having a tractor chassis carrying propelling mechanism including a selective transmission and having a trailer chassis, one end of which is pivotally mounted upon the tractor chassis, said pivotal mounting providing movement about a substantially vertical axis, the combination of a universally-mounted lever having its center of movement substantially upon the axis of said pivotal mounting, a support member for supporting said lever, said support member being fixedly mounted upon a portion of the tractor chassis, and connections between said lever and the selective transmission for operating said transmission.

3. In a vehicle having a tractor chassis carrying propelling mechanism including a selective transmission and having a trailer chassis, one end of which is pivotally mounted upon the tractor chassis, said pivotal mounting providing movement about a substantially vertical axis, the combination of a support member fixedly mounted upon a portion of the tractor chassis, said member having a cup therein substantially upon the axis of said pivotal mounting, a lever having a spherical portion formed thereon, said spherical portion resting in said cup, and connections between said lever and the selective transmission for operating said transmission.

4. A control for the selective transmission mechanism of a vehicle having a tractor chassis carrying propelling mechanism including the said selective transmission and having a trailer chassis, one end of which is pivotally mounted upon the tractor chassis, said pivotal mounting providing movement about a substantially vertical axis, said control including a rotatably and slidably mounted rod having one end adjacent said transmission mechanism and the other end adjacent said pivotal mounting, a rocker mounted on said rod adjacent the last-mentioned end thereof, a universally mounted lever one end of which engages said rocker for imparting rotational and longitudinal movement to said rod, and an arm carried by the other end of said rod and engaging said transmission mechanism for operating the same in the movement of said rod.

5. In a vehicle having a tractor unit and a trailer unit, the forward end of which is pivotally mounted upon the tractor unit, the combination of an engine having selective transmission mechanism mounted upon said tractor unit, a support member mounted upon said tractor unit, a second support member pivotally mounted upon said first support member for movement about a substantially vertical axis, said second support member carrying the forward end of said trailer unit, a rod, one end of which is rotatably and slidably mounted on said first support member, and the other end of which is similarly mounted adjacent said transmission mechanism, a lever universally supported upon said first support member, a rocker mounted on said rod, said rocker engaging one end of said lever for imparting rotational and longitudinal movement to said rod in the movements of said lever, and an arm carried by the other end of said rod and engaging said transmission mechanism for operating the same in the movements of said rod.

6. In a vehicle having a tractor unit and a trailer unit, the forward end of which is pivotally mounted upon the tractor unit, the combination of an engine having selective transmission mechanism mounted upon said tractor unit, a support member mounted upon said tractor unit, a second support member pivotally mounted upon said first support member for movement about a substantially vertical axis, said second support member carrying the forward end of said trailer unit, a rod, one end of which is rotatably and slidably mounted on said first support member and the other end of which is similarly mounted adjacent said transmission mechanism, a lever universally supported upon said first support member and having its center of movement substantially upon said vertical axis, a rocker mounted on said rod, said rocker engaging one end of said lever for imparting rotational and longitudinal movement to said rod in the movements of said lever, and an arm carried by the other end of said rod and engaging said transmission mechanism for operating the same in the movements of said rod.

In witness whereof, I have hereunto affixed my signature.

WILLIAM L. HOGE.

CERTIFICATE OF CORRECTION.

Patent No. 1,846,394. Granted February 23, 1932, to

WILLIAM L. HOGE.

It is hereby certified that error appears in the printed specification of the above numbered patent requiring correction as follows: Page 2, line 51, claim 1, for "somewhat" read movement; and that the said Letters Patent should be read with this correction therein that the same may conform to the record of the case in the Patent Office.

Signed and sealed this 5th day of April, A. D. 1932.

(Seal)

M. J. Moore,
Acting Commissioner of Patents.